(12) United States Patent
Dognin et al.

(10) Patent No.: US 8,635,067 B2
(45) Date of Patent: Jan. 21, 2014

(54) MODEL RESTRUCTURING FOR CLIENT AND SERVER BASED AUTOMATIC SPEECH RECOGNITION

(75) Inventors: Pierre Dognin, White Plains, NY (US); Vaibhava Goel, Chappaqua, NY (US); John R. Hershey, White Plains, NY (US); Peder A. Olsen, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 491 days.

(21) Appl. No.: 12/964,433

(22) Filed: Dec. 9, 2010

(65) Prior Publication Data

US 2012/0150536 A1 Jun. 14, 2012

(51) Int. Cl.
*G10L 15/14* (2006.01)

(52) U.S. Cl.
USPC ............... 704/256.3; 704/256.1; 704/256.2

(58) Field of Classification Search
USPC .................................................. 704/231–257
See application file for complete search history.

(56) References Cited

U.S. PATENT DOCUMENTS

| | | | |
|---|---|---|---|
| 6,107,935 A | | 8/2000 | Comerford et al. |
| 6,411,930 B1 * | | 6/2002 | Burges ........................... 704/240 |
| 7,216,077 B1 * | | 5/2007 | Padmanabhan et al. ...... 704/240 |
| 7,295,978 B1 * | | 11/2007 | Schwartz et al. .............. 704/240 |
| 7,539,617 B2 * | | 5/2009 | Mami et al. .................... 704/256 |
| 2003/0163313 A1 | | 8/2003 | Rees |
| 2003/0171931 A1 | | 9/2003 | Chang |
| 2004/0059576 A1 | | 3/2004 | Lucke |
| 2004/0260548 A1 | | 12/2004 | Attias |
| 2008/0270127 A1 | | 10/2008 | Kobayashi et al. |
| 2010/0121640 A1 * | | 5/2010 | Zheng et al. ................... 704/240 |

OTHER PUBLICATIONS

Pierre L. Dognin et al., "Refactoring acoustic models using variational density approximation," in ICASSP, Apr. 2009, pp. 4473-4476.
Pierre L. Dognin et al., "Refactoring acoustic models using variational expectation maximization," in Interspeech, Sep. 2009, pp. 212-215.

(Continued)

*Primary Examiner* — Jesse Pullias
(74) *Attorney, Agent, or Firm* — Anne V. Dougherty; Otterstedt, Ellenbogen & Kammer, LLP

(57) ABSTRACT

Access is obtained to a large reference acoustic model for automatic speech recognition. The large reference acoustic model has L states modeled by L mixture models, and the large reference acoustic model has N components. A desired number of components $N^c$, less than N, to be used in a restructured acoustic model derived from the reference acoustic model, is identified. The desired number of components $N^c$ is selected based on a computing environment in which the restructured acoustic model is to be deployed. The restructured acoustic model also has L states. For each given one of the L mixture models in the reference acoustic model, a merge sequence is built which records, for a given cost function, sequential mergers of pairs of the components associated with the given one of the mixture models. A portion of the $N^c$ components is assigned to each of the L states in the restructured acoustic model. The restructured acoustic model is built by, for each given one of the L states in the restructured acoustic model, applying the merge sequence to a corresponding one of the L mixture models in the reference acoustic model until the portion of the $N^c$ components assigned to the given one of the L states is achieved.

24 Claims, 5 Drawing Sheets

```
Input: GMM fs
Output: Merge-Sequence S(fs)
foreach Gaussian pair (i, j) ∈ fs do
    | merging cost: Cfs (i, j)
end
merge sequence index: ks = 1
while (Ns = |fs|) is greater than 1 do
    Find pair with smallest cost Cfs (i, j):
        (i',j') = arg min Cfs (i, j)
                    i,j
    Merge: f's = merge(fs, i', j')
    Record:
        S(fs)[ks].pair = (i', j'),
        S(fs)[ks].cost = Cfs (i', j')
    Update:
        fs = f's
        ks = ks + 1
        Cfs
end
Technique 1: Building Merge-Sequence S(fs) for a GMM fs.
```

(56) References Cited

OTHER PUBLICATIONS

Kai Zhang and James T. Kwok, "Simplifying mixture models through function approximation," in NIPS 19, pp. 1577-1584. MIT Press, 2007.

Xiao-Bing Li et al., "Optimal clustering and non-uniform allocation of Gaussian kernels in scalar dimension for HMM compression," in ICASSP, Mar. 2005, pp. 669-672.

Imre Csiszár, "Why least squares and maximum entropy? an axiomatic approach to inference for linear inverse problems," Annals of Statistics, v. 19, n. 4, pp. 2032-2066, 1991.

Steve Young et al., The HTK Book (for HTK Version 3.3), Cambridge University Engineering Department, 2005.

E. Marcheret et al., "Optimal quantization and bit allocation for compressing large feature space transforms," IEEE Workshop on ASR & Understanding 2009, pp. 64-69.

Pierre L. Dognin et al., "Restructuring Exponential Family Mixture Models", Interspeech 2010, Sep. 2010, pp. 62-65.

Solomon Kullback, "Information Theory and Statistics". Dover Publications, Jul. 7, 1997.

* cited by examiner

FIG. 1

```
Input: GMM $f_s$
Output: Merge-Sequence $S(f_s)$
foreach Gaussian pair $(i, j) \in f_s$ do
    | merging cost: $C_{f_s}(i, j)$
end
merge sequence index: $k_s = 1$
while $(N_s = |f_s|)$ is greater than 1 do
    Find pair with smallest cost $C_{f_s}(i, j)$:
    $(i', j') = \arg\min_{i,j} C_{f_s}(i, j)$
    Merge: $f'_s = \text{merge}(f_s, i', j')$
    Record:
    $S(f_s)[k_s].\text{pair} = (i', j')$,
    $S(f_s)[k_s].\text{cost} = C_{f_s}(i', j')$
    Update:
    $f_s = f'_s$
    $k_s = k_s + 1$
    $C_{f_s}$
end
Technique 1: Building Merge-Sequence $S(f_s)$ for a GMM $f_s$.
```

FIG. 3

WER (%) vs MODEL SIZE (K)

| MODELS | 5 | 10 | 15 | 20 | 25 | 30 | 35 | 40 | 45 | 50 | 55 | 60 | 65 | 70 | 75 | 80 | 85 | 90 | 95 | 100 |
|---|---|---|---|---|---|---|---|---|---|---|---|---|---|---|---|---|---|---|---|---|
| BASELINE | 2.49 | 2.00 | 1.68 | 1.49 | 1.37 | 1.38 | 1.39 | 1.33 | 1.27 | 1.31 | 1.29 | 1.27 | 1.27 | 1.29 | 1.22 | 1.21 | 1.30 | 1.20 | 1.21 | 1.18 |
| 100K-STC | 2.53 | 1.89 | 1.70 | 1.51 | 1.39 | 1.35 | 1.34 | 1.30 | 1.32 | 1.28 | 1.28 | 1.28 | 1.25 | 1.23 | 1.16 | 1.23 | 1.20 | 1.23 | 1.22 | 1.18 |
| GC-MODELS | 2.87 | 2.05 | 1.79 | 1.64 | 1.52 | 1.49 | 1.40 | 1.39 | 1.32 | 1.30 | 1.27 | 1.25 | 1.25 | 1.23 | 1.21 | 1.21 | 1.19 | 1.21 | 1.18 | 1.18 |
| GC-α | 2.87 | 2.04 | 1.78 | 1.65 | 1.52 | 1.47 | 1.40 | 1.38 | 1.32 | 1.30 | 1.26 | 1.24 | 1.25 | 1.24 | 1.21 | 1.21 | 1.21 | 1.20 | 1.19 | 1.18 |
| GC-VITERBI | 3.32 | 2.31 | 1.81 | 1.64 | 1.52 | 1.48 | 1.42 | 1.38 | 1.35 | 1.31 | 1.28 | 1.28 | 1.28 | 1.27 | 1.24 | 1.22 | 1.21 | 1.19 | 1.15 | 1.18 |
| GC-GGA | 3.30 | 2.51 | 2.28 | 1.92 | 1.85 | 1.68 | 1.60 | 1.56 | 1.40 | 1.35 | 1.35 | 1.31 | 1.29 | 1.25 | 1.25 | 1.24 | 1.22 | 1.21 | 1.19 | 1.18 |
| GC-α+dvarEM | 2.76 | 1.99 | 1.77 | 1.63 | 1.50 | 1.46 | 1.41 | 1.38 | 1.32 | 1.30 | 1.27 | 1.24 | 1.25 | 1.24 | 1.21 | 1.21 | 1.21 | 1.20 | 1.19 | 1.18 |

WERs FOR BASELINE, 100K-STC MODELS. MODELS CLUSTERED WITH GC-MODELS, GC-VITERBI, GC-GGA, GC-α (THEN REFINED WITH dvarEM)

MODEL RESTRUCTURING FOR CLIENT AND SERVER BASED AUTOMATIC SPEECH RECOGNITION

FIELD OF THE INVENTION

The present invention relates to the electrical, electronic and computer arts, and, more particularly, to automatic speech recognition (ASR) and the like.

BACKGROUND OF THE INVENTION

ASR is now present on a wide variety of platforms, ranging from huge server farms to small embedded devices. Each platform has its own resource limitations and this variety of requirements makes building acoustic models (AMs) for all these platforms a delicate task of balancing compromises between model size, decoding speed, and accuracy. In practice, AMs are custom built for each of these platforms. Furthermore, in ASR, it is often desirable to dynamically adjust the complexity of models depending on the load on the machine on which recognition is being carried out. In times of heavy use, it is desirable to use models of low complexity so that a larger number of engines can be run. On the other hand, when the resources are available, it is feasible to use more complex and more accurate models. Current techniques rely on building and storing multiple models of varying complexity. This causes an overhead in model development time. It also results in storage cost at run time. Furthermore, we are limited in complexity control by the number of models available.

SUMMARY OF THE INVENTION

Principles of the invention provide techniques for model restructuring for client and server based automatic speech recognition. In one aspect, an exemplary method includes the step of obtaining access to a large reference acoustic model for automatic speech recognition. The large reference acoustic model has L states modeled by L mixture models, and the large reference acoustic model has N components. Another step includes identifying a desired number of components $N^c$, less than N, to be used in a restructured acoustic model derived from the reference acoustic model. The desired number of components $N^c$ is selected based on a computing environment in which the restructured acoustic model is to be deployed. The restructured acoustic model also has L states. Yet another step includes, for each given one of the L mixture models in the reference acoustic model, building a merge sequence which records, for a given cost function, sequential mergers of pairs of the components associated with the given one of the mixture models. Further steps include assigning a portion of the $N^c$ components to each of the L states in the restructured acoustic model; and building the restructured acoustic model by, for each given one of the L states in the restructured acoustic model, applying the merge sequence to a corresponding one of the L mixture models in the reference acoustic model until the portion of the $N^c$ components assigned to the given one of the L states is achieved (note that, as discussed below, the merge can, in some instances, be done "all at once").

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s), or (iii) a combination of hardware and software modules; any of (i)-(iii) implement the specific techniques set forth herein, and the software modules are stored in a computer-readable recordable storage medium (or multiple such media).

Techniques of the present invention can provide substantial beneficial technical effects. For example, one or more embodiments may provide one or more of the following advantages:

- offline pre-processing allowing on-the-fly acoustic model generation
- easily parallelizable on the acoustic states (which may or may not be context-dependent)

These and other features and advantages of the present invention will become apparent from the following detailed description of illustrative embodiments thereof, which is to be read in connection with the accompanying drawings.

BRIEF DESCRIPTION OF THE DRAWINGS

FIG. 1 depicts a first technique for building Merge-Sequence $S(f_s)$ for a GMM $f_s$, according to an aspect of the invention;

FIG. 3 presents a table of WERs for baseline, 100K-STC models, according to an aspect of the invention;

DETAILED DESCRIPTION OF PREFERRED EMBODIMENTS

Figure 2:
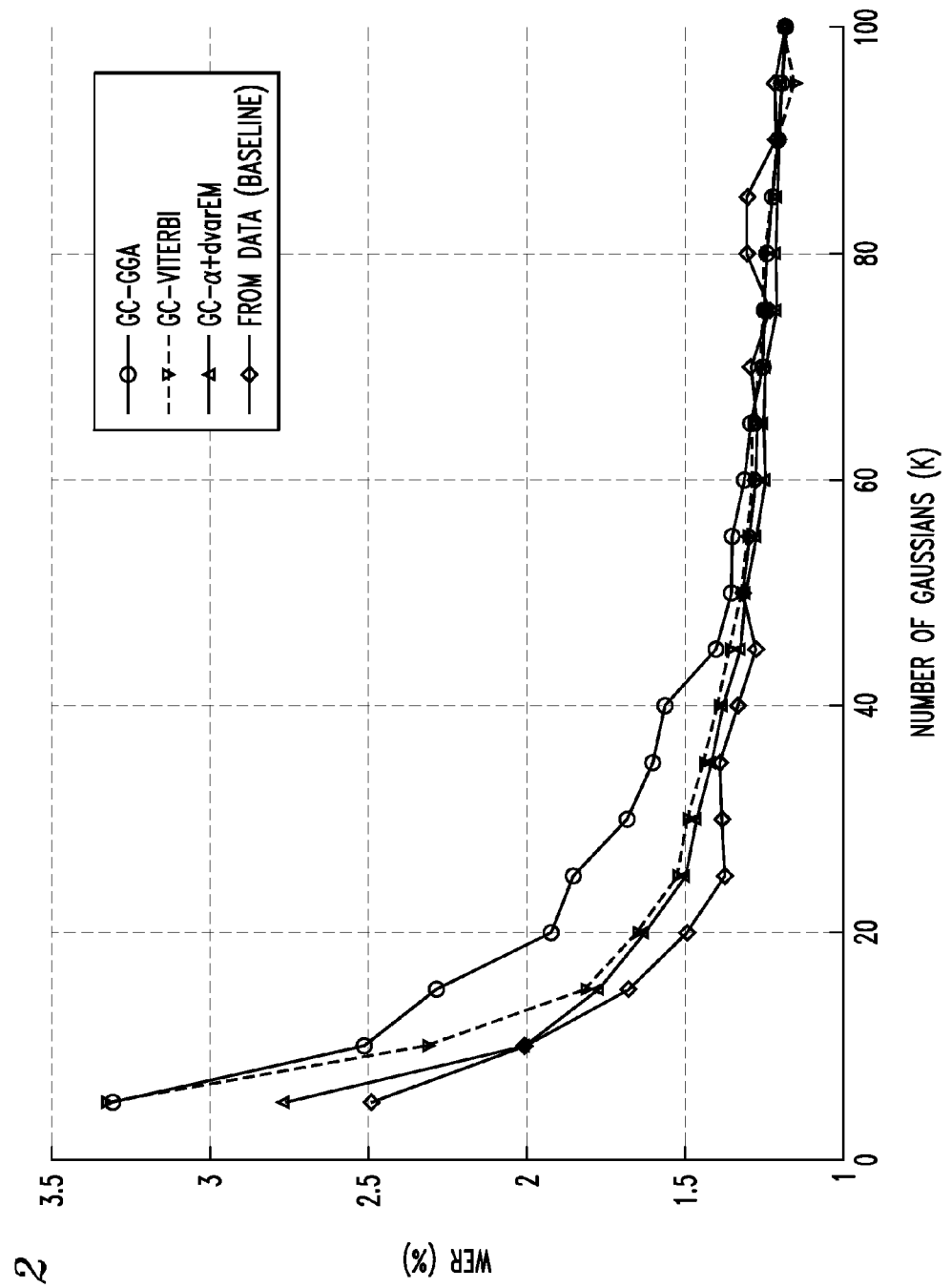
FIG. 2 shows WERs for models trained from data (baseline), clustered using GC-GGA, GC-viterbi, GC-α refined with dvarEM, according to an aspect of the invention.

As noted, ASR is now present on a wide variety of platforms, ranging from huge server farms to small embedded devices. Each platform has its own resource limitations and this variety of requirements makes building acoustic models (AMs) for all these platforms a delicate task of balancing compromises between model size, decoding speed, and accuracy. In practice, AMs are custom built for each of these platforms. Furthermore, in ASR, it is often desirable to dynamically adjust the complexity of models depending on the load on the machine on which recognition is being carried out. In times of heavy use, it is desirable to use models of low complexity so that a larger number of engines can be run. On the other hand, when the resources are available, it is feasible to use more complex and more accurate models. Current techniques rely on building and storing multiple models of varying complexity.

Advantageously, one or more embodiments reduce overhead in model development time, as compared to current techniques; reduce storage cost at run time; and/or allow for enhanced complexity control, as compared to current techniques, which are typically limited in complexity control by the number of models available.

One or more embodiments employ model restructuring. In this approach, a large reference model is built from data. Smaller models are then derived from this reference model in such a way that the smaller models approximate the distribution specified by the large model. This has several advantages over the current known approaches—it does not incur the extra build time or storage cost. Smaller models can be constructed on demand. One or more embodiments allow an almost continuous control over model complexity.

Note that one or more embodiments are described in the context of Gaussian mixture models but other approaches are possible; e.g., exponential densities as described in Pierre L. Dognin et al., "Restructuring Exponential Family Mixture Models," Interspeech 2010, September 2010, pp. 62-65.

An issue often encountered in probabilistic modeling is restructuring a model to change its number of components, parameter sharing, or some other structural constraints. Automatic Speech Recognition (ASR) has become ubiquitous and building acoustic models (AMs) that can retain good performance while adjusting their size to application requirements is a challenging problem. AMs are usually built around Gaussian mixture models (GMMs) that can each be restructured, directly impacting the properties of the overall AM. For instance, generating smaller AMs from a reference AM can simply be done by restructuring the underlying GMMs to have fewer components while best approximating the original GMMs. Maximizing the likelihood of a restructured model under the reference model is equivalent to minimizing their Kullback-Leibler (KL) divergence. For GMMs, this is analytically intractable. However, a lower bound to the likelihood can be maximized and a variational expectation-maximization (EM) can be derived. Using variational KL divergence and variational EM in the task of AM clustering, one or more embodiments define a greedy clustering technique that can build on demand clustered models of any size from a reference model. Non-limiting experimental results show that clustered models are on average within 2.7% of the WERs for equivalent models built from data, and only at 9% for a model 20 times smaller than the reference model. This makes clustering a reference model a viable option to training models from data.

It is often desirable in probabilistic modeling to approximate one model using another model with a different structure. By changing the number of components or parameters, by sharing parameters differently, or simply by modifying some other constraints, a model can be restructured to better suit the requirements of an application. Model restructuring is particularly relevant to the field of Automatic Speech Recognition (ASR) since ASR is now present on a wide variety of platforms, ranging from huge server farms to small embedded devices. Each platform has its own resource limitations and this variety of requirements makes building acoustic models (AMs) for all these platforms a delicate task of balancing compromises between model size, decoding speed, and accuracy. It is believed that that model restructuring can alleviate issues with building AMs for various platforms.

Clustering, parameter sharing, and hierarchy building are three different examples of AM restructuring commonly used in ASR. For instance, clustering an AM to reduce its size, despite a moderate degradation in recognition performance, has an impact on both ends of the platform spectrum. For servers, it means more models can fit into memory and more engines can run simultaneously sharing these models. For mobile devices, models can be custom-built to exactly fit into memory. Sharing parameters across components is another restructuring technique that efficiently provides smaller models with adjustable performance degradation. Restructuring an AM by using a hierarchy speeds up the search for the most likely components and directly impacts recognition speed and accuracy. One or more embodiments cluster models efficiently.

When restructuring models, an issue that arises is measuring similarity between the reference and the restructured model. Minimizing the Kullback-Leibler (KL) divergence (reference is made to S. Kullback, Information Theory and Statistics, Dover Publications, Mineola, N.Y., 1997) between these two models is equivalent to maximizing the likelihood of the restructured model under data drawn from the reference model. Unfortunately, this is intractable for Gaussian Mixture Models (GMMs), a core component of AMs, without resorting to expensive Monte Carlo techniques. However, it is possible to maximize a variational lower bound to the likelihood and derive from it a variational KL divergence (see Pierre L. Dognin et al., "Refactoring acoustic models using variational density approximation," in ICASSP, April 2009, pp. 4473-4476) as well as an Expectation-Maximization (EM) technique (see Pierre L. Dognin et al., "Refactoring acoustic models using variational expectation maximization," in Interspeech, September 2009, pp. 212-215) that will update the parameters of a model to better match a reference model. Both variational KL divergence and variational EM can be components of model restructuring. One or more embodiments provide a greedy clustering technique, based on these methods, which provides clustered and refined models of any size, on demand.

For other approaches, based on minimizing the mean-squared error between the two density functions, see Kai Zhang and James T. Kwok, "Simplifying mixture models through function approximation," in NIPS 19, pp. 1577-1584, MIT Press, 2007; or based on compression using dimension-wise tied Gaussians optimized using symmetric KL divergences, see Xiao-Bing Li et al., "Optimal clustering and non-uniform allocation of Gaussian kernels in scalar dimension for HMM compression," in ICASSP, March 2005, pp. 669-672.

Non-limiting experimental results show that, starting with a large acoustic model, smaller models can be derived that achieve word error rates (WERs) almost identical to those for similar size models trained from data. This reduces or eliminates the need to train models of every desired size.

Models

Acoustic models are typically structured around phonetic states and take advantage of phonetic context while modeling observation. Let A be an acoustic model composed of L context dependent (CD) states. L is chosen at training time and typically ranges from a few hundreds to a few thousands. Each CD state s uses a GMM $f_s$ with $N_s$ components resulting in A having $N=\Sigma_s N_s$ Gaussians, A GMM f with continuous observation $x \in \mathbb{R}^d$ is specified as:

$$f(x) = \sum_a \pi_a f_a(x) = \sum_a \pi_a \mathcal{N}(x; \mu_a, \Sigma_a), \quad (1)$$

where a indexes components off f, $\pi_a$ is the prior probability, and $\mathcal{N}(x; \mu_a, \Sigma_\alpha)$ is a Gaussian in x with mean vector $\mu_a$ and covariance matrix $\Sigma_a$ which is symmetric and positive definite. In general, $\Sigma_a$ is a full matrix but in practice it is typically chosen to be diagonal for computation and storage efficiency.

Variational KL Divergence

The KL divergence (see Kullback reference) is a commonly used measure of dissimilarity between two probability density functions (pdfs)/(x) and g(x), $$D_{KL}(f\|g) \stackrel{def}{=} \int f(x) \log \frac{f(x)}{g(x)} dx \quad (2)$$

$$= L(f\|f) - L(f\|g), \quad (3)$$

where L(f||g) is the expected log likelihood of g under f, $$L(f\|g) \stackrel{def}{=} \int f(x) \log g(x) dx. \quad (4)$$

In the case of two GMMs f and g, the expression for L(f||g) becomes:

$$L(f\|g) = \sum_a \pi_a \int f_a(x) \log \sum_b \omega_b g_b(x) dx, \quad (5)$$

where the integral $\int f_a \log \Sigma_b \omega_b g_b$ is analytically intractable. As a consequence, $D_{KL}(f\|g)$ is intractable for GMMs.

One solution presented in the Dognin Interspeech reference provides a variational approximation to $D_{KL}(f\|g)$. This is done by first providing variational approximations to L(f||f) and L(f||g) and then using equation (3). In order to define a variational approximation to equation (5), variational parameters $\phi_{b|a}$ are introduced as a measure of the affinity between the Gaussian component $f_a$ of f and component $g_b$ of g. The variational parameters must satisfy the constraints:

$$\phi_{b|a} \geq 0 \text{ and } \sum_b \phi_{b|a} = 1. \quad (6)$$

By using Jensen's inequality, a lower bound is obtained for equation (5), $$L(f\|g) = \sum_a \pi_a \int f_a(x) \log \sum_b \phi_{b|a} \frac{\omega_b g_b(x)}{\phi_{b|a}} dx \quad (7)$$

$$\geq \sum_a \pi_a \int f_a(x) \sum_b \phi_{b|a} \log \frac{\omega_b g_b(x)}{\phi_{b|a}} dx$$

$$= \sum_a \pi_a \sum_b \phi_{b|a} \left( \log \frac{\omega_b}{\phi_{b|a}} + L(f_a\|g_b) \right)$$

$$\stackrel{def}{=} \mathcal{L}_\phi(f\|g). \quad (8)$$

The lower bound on L(f||g), given by the variational approximation $\mathcal{L}_\phi(f\|g)$, can be maximized with respect to (w.r.t.) $\phi$ and the best bound is given by:

$$\hat{\phi}_{b|a} = \frac{\omega_b e^{L(f_a\|g_b)}}{\sum_{b'} \omega_{b'} e^{L(f_a\|g_{b'})}} \quad (9)$$

By substituting $\hat{\phi}_{b|a}$ in equation (7), the following expression for $\mathcal{L}\hat{\phi}(\kappa\|g)$ is obtained:

$$\mathcal{L}_{\hat{\phi}}(f\|g) = \sum_a \pi_a \sum_b \hat{\phi}_{b|a} \left( \log \frac{\omega_b}{\hat{\phi}_{b|a}} + L(f_a\|g_b) \right) \quad (10)$$

$$= \sum_a \pi_a \log \left( \sum_b \omega_b e^{L(f_a\|g_b)} \right).$$

$\mathcal{L}_{\hat{\phi}}(f\|g)$ is the best variational approximation of the expected log likelihood L(f||g) and is referred to as variational likelihood. Similarly, the variational likelihood $\mathcal{L}_{\hat{\phi}}(f\|f)$, which maximizes a lower bound on L(f||f), is:

$$\mathcal{L}_{\hat{\psi}}(f\|f) = \sum_a \pi_a \log \left( \sum_{a'} \pi_{a'} e^{L(f_a\|f_{a'})} \right). \quad (11)$$

The variational KL divergence $\mathcal{D}_{KL}(f\|g)$ is obtained directly from equations (10) and (11) since $\mathcal{D}_{KL}(f\|g) = \mathcal{L}_{\hat{\phi}}(f\|f) - \mathcal{L}_{\hat{\phi}}(f\|g)$, $$\mathcal{D}_{KL}(f\|g) = \sum_a \pi_a \log \left( \frac{\sum_{a'} \pi_{a'} e^{-D_{KL}(f_a\|f_{a'})}}{\sum_b \omega_b e^{-D_{KL}(f_a\|g_b)}} \right), \quad (12)$$

where $\mathcal{D}_{KL}(f\|g)$ is based on the KL divergences between all individual components of f and g.

Generalized Variational KL Divergence

One or more embodiments extend the variational KL to weighted densities $\bar{f}$ and $\bar{g}$ where $\alpha = \int \bar{f}$ and $\beta = \int \bar{g}$ so that $f = \bar{f}/\alpha$ and $g = \bar{g}/\beta$ are the corresponding pdfs. The generalized KL divergence in the Bregman divergence family, as given in Imre Csiszar, "Why least squares and maximum entropy? An axiomatic approach to inference for linear inverse problems," Annals of Statistics, vol. 19, no. 4, pp. 2032-2066, 1991, is:

$$\bar{D}_{KL}(\bar{f}\|\bar{g}) = \int \bar{f}(x) \log \frac{\bar{f}(x)}{\bar{g}(x)} dx + \int \bar{g}(x) - \bar{f}(x) dx. \quad (13)$$

$$= \alpha D_{KL}(f\|g) + \alpha \log \frac{\alpha}{\beta} + \beta - \alpha. \quad (14)$$

For pdfs f and g, $\int f = \int g = 1$ and equation (14) yields $D_{KL}(f\|g)$ as expected. If $\bar{f}$ and $\bar{g}$ are weighted GMMs, it is straightforward to define a generalized variational KL from equations (12) and (14), $$\bar{\mathcal{D}}_{KL}(\bar{f}\|\bar{g}) \stackrel{def}{=} \alpha \mathcal{D}_{KL}(f\|g) + \alpha \log \frac{\alpha}{\beta} + \beta - \alpha, \quad (15)$$

where $\bar{\mathcal{D}}_{KL}(\bar{f}\|\bar{g})$ is based on the variational KL divergence between GMMs f and g.

Weighted Local Maximum Likelihood

Consider a weighted GMM $\bar{f}_Q$ where $\bar{f}_Q = \Sigma_{i \in Q} \pi_i f_i$ with $Q = \{i, j, \ldots, k\}$ being a subset of indices of the components in GMM f. Its normalized counterpart is $f_Q = \Sigma_{i \in Q} \hat{\pi}_i f_i$ where $\hat{\pi}_i = \pi_i / \Sigma_{i' \in Q} \pi_{i'}$ is a normalized prior, and $\bar{f}_Q = (\Sigma_{i \in Q} \pi_i) f_Q$. Define $\bar{g} = \text{merge}(\bar{f}_Q)$, where $\bar{g}$ is the weighted Gaussian resulting from merging all the components of $\bar{f}_Q$. The maximum likelihood parameters $\{\pi, \mu, \Sigma\}$ associated with $\bar{g}$ are defined as:

$$\pi = \sum_{i \in Q} \pi_i, \quad (16)$$

$$\mu = \frac{\sum_{i \in Q} \pi_i \mu_i}{\sum_{i \in Q} \pi_i}, \quad (17)$$

$$\Sigma = \frac{\sum_{i \in Q} \pi_i \left[ \sum_i + (\mu_i - \mu)(\mu_i - \mu)^T \right]}{\sum_{i \in Q} \pi_i}. \quad (18)$$

An especially useful case of the generalized variational KL divergence is $\bar{\mathfrak{D}}_{KL}(\bar{f}_Q \| \bar{g})$. Define $\alpha = \int \bar{f}_Q$ and $\beta = \int \bar{g}$. Thus, $\alpha = \beta = \Sigma_{i \in Q} \pi_i$ and $\bar{\mathfrak{D}}_{KL}(\bar{f}_Q \| \bar{g})$ becomes:

$$\bar{\mathfrak{D}}_{KL}(\bar{f}_Q \| \bar{g}) = \alpha \mathfrak{D}_{KL}(f_Q \| g) + \alpha \log \frac{\alpha}{\beta} + \beta - \alpha \quad (19)$$

$$= \left( \sum_{i \in Q} \pi_i \right) \mathfrak{D}_{KL}(f_Q \| g).$$

$$= \left( \sum_{i \in Q} \pi_i \right) [\mathcal{L}(f_Q \| f_Q) - \mathcal{L}(f_Q \| g)], \quad (20)$$

where $g = \bar{g}/\beta$. When $\bar{g}$ is the merged Gaussian of all components of $\bar{f}_Q$, the generalized variational KL becomes a weighted version of the variational KL divergence for $f_Q$ and g properly normalized. Define a weighted GMM $\bar{p}$ from two weighted components $\bar{f}_i$ and $\bar{f}_j$ of GMM f such that $\bar{p} = \pi_i f_i + \pi_j f_j$, and where $\bar{q}$ is a weighted Gaussian such that $\bar{q}$ merge($\pi_i f_i$, $\pi_i f_i$), obtain from equation (19) that:

$$\bar{\mathfrak{D}}_{KL}(\bar{p} \| \bar{q}) = (\pi_i + \pi_j) \mathfrak{D}_{KL}(p \| q). \quad (21)$$

In this special case, it is clear from equation (20) that $\bar{\mathfrak{D}}_{KL}(\bar{p} \| \bar{q})$ measures the difference in variational likelihoods between the GMM $\bar{p}$ and the merged Gaussian $\bar{q}$, effectively providing the divergence between a pair of Gaussians and their resulting merge. For selecting similar pairs of Gaussians, when the Gaussians are constrained to have diagonal covariances, the pair $f_i$ and $f_j$ is well approximated by $\bar{q}$ under this constraint, i.e. the covariance of $\bar{q}$ will be closer to diagonal than for any other pairs. This is the cost function used in clustering in one or more embodiments and it is called weighted Local Maximum Likelihood (wLML).

Variational Expectation-Maximization

In the context of restructuring models, the variational KL divergence $\mathfrak{D}_{KL}(f \| g)$ can be minimized by updating the parameters of the restructured model g to match the reference model j: Since the variational KL divergence $\mathfrak{D}_{KL}(f \| g)$ gives an approximation to $D_{KL}(f \| g)$, $\mathfrak{D}_{KL}(f \| g)$ can be minimized w.r.t. the parameters of g, $\{\pi_b, \mu_b, \Sigma_b\}$. It is sufficient to maximize $\mathcal{L}_\phi(f \| g)$, as $\mathcal{L}_\phi(f \| f)$ is constant in g. Although equation (10) is not easily maximized w.r.t. the parameters of g, $\mathcal{L}_\phi(f \| g)$ in equation (7) can be maximized leading to an Expectation-Maximization (EM) technique.

In one or more embodiments, it is desirable to maximize $\mathcal{L}_\phi(f \| g)$, w.r.t $\phi$ and the parameters $\{\pi_b, \mu_b, \Sigma_b\}$ of g. This can be achieved by defining a variational Expectation-Maximization (varEM) technique where we first maximize $\mathcal{L}_\phi(f \| g)$ w.r.t. $\phi$. With $\phi$ fixed, then maximize $\mathcal{L}_\phi(f \| g)$ w.r.t the parameters of g, Previously, the best lower bound on $L(f \| g)$ with $\mathcal{L}_{\hat{\phi}}(f \| g)$ was found as given by $\hat{\phi}_{b|a}$ in equation (9). This is the expectation (E) step:

$$\hat{\phi}_{b|a} = \frac{\omega_b e^{-D_{KL}(f_a \| g_b)}}{\sum_{b'} \pi_{b'} e^{-D_{KL}(f_a \| g_{b'})}}. \quad (22)$$

For a fixed $\phi_{b|a} = \hat{\phi}_{b|a}$, it is now possible to find the parameters of g that maximize $\mathcal{L}_{100}(f \| g)$. The maximization (M) step is:

$$\pi_b^* = \sum_a \pi_a \phi_{b|a}, \quad (23)$$

$$\mu_b^* = \frac{\sum_a \pi_a \phi_{b|a} \mu_a}{\sum_a \pi_a \phi_{b|a}}, \quad (24)$$

$$\Sigma_b^* = \frac{\sum_a \pi_a \phi_{b|a} \left[ \sum_a + (\mu_a - \mu_b^*)(\mu_a - \mu_b^*)^T \right]}{\sum_a \pi_a \phi_{b|a}}. \quad (25)$$

The technique alternates between the E-step and M-step, increasing the variational likelihood in each step.

Discrete Variational EM

If $\phi_{b|a}$ is constrained to $\{0, 1\}$, this provides a hard assignment of the components of f to the components of g. Let $\Phi_{b|a}$ be the constrained $\phi_{b|a}$. In the constrained E-step, a given a is assigned to the b for which $\phi_{b|a}$ is greatest. That is, find $\hat{b} = \arg\max_b \Phi_{b|a}$, and set $\Phi_{\hat{b}|a} = 1$ and $\Phi_{b|a} = 0$ for all $b \neq \hat{b}$. In the rare case where several components are assigned the same value $\max_b \phi_{b|a}$, choose the smallest index of all these components as $\hat{b}$. The M-step remains the same, and the resulting $g_b$ is the maximum likelihood Gaussian given the subset Q of components indices from f provided by $\Phi$; the equations (23)-(25) are then similar to the merge steps in (16)-(18) with $\Phi$ providing the subset Q. This is called the discrete variational EM (discrete varEM).

Model Clustering

Clustering down an acoustic model A of size N into a model $\mathcal{A}^c$ of target size $N^c$ means reducing the overall number of Gaussian components. In the reference model A, each state s uses a GMM $f_s$ with $N_s$ components to model observation. Create a new model $\mathcal{A}^c$ by clustering down each $f_s$ independently into $f_s^c$ of size $N_s^c$ such that $1 \leq N_s^c \leq N_s$. The final clustered model $\mathcal{A}^c$ has $N^c$ Gaussian components with $N^c = \Sigma_s N_s^c \leq N$.

A greedy approach is taken to produce $f_s^c$ from $f_s$ which finds the best sequence of merges to perform within each $f_s$ so that $\mathcal{A}^c$ reaches the target size $N^c$. This procedure can be divided into two independent parts: 1) cluster down $f_s$ optimally to any size. 2) define a criterion to decide the optimal target size $N_s^c$ for each $f_s$ under the constraint $N^c = \Sigma_s N_s^c$. Once the best sequence of merges and $N_s^c$ are known, it is straightforward to produce $f_s^c$ by using equations (16)-(18).

Greedy Clustering and Merge-Sequence Building

The greedy technique used in one or more embodiments clusters down $f_s$ by sequentially merging component pairs that are similar. For a given cost function, this sequence of merges is deterministic and unique. It is therefore possible to cluster $f_s$ all the way to one final component, while recording each merge and its cost into a merge-sequence $S(f_s)$.

Technique 1 depicted in FIG. 1 shows how to build $S(f_x)$ for any $f_s$. At each step, the pair of component $(f_i, f_j)$ in $f_s$ that gives the smallest cost is merged. This results in a new GMM $f'_s$ which is used as $f_s$ for the next iteration. The technique iterates until only one component is left in $f_s$ while recording each step in $S(f_s)$. Technique 1 is clearly independent of the cost function $C_{f_s}$. For the greedy clustering (GC), wLML is the cost function since it measures the likelihood loss when merging a component pair, as discussed earlier.

Given, $f_s$ and $S(f_s)$, it is possible to generate clustered models $f_s^c\{k_s\}$ of any size simply by applying the sequence of merges recorded in $S(f_s)$ to $f_s$ all the way to the $k_s$-th merge step. These clustered models span from the original $f_s^c\{0\}=f_s$ to a final $f_s^c\{N_s-1\}$. At each step $k_s$, every new model $f_s^c\{k_s\}$ has one component less than $f_s^c\{k_s-1\}$. Therefore, $f_s^c$ of any target size $N_s^c$ can be generated from $f_s$ and $S(f_s)$. To generate $f_s^c$ from $f_s$, there exists another equivalent option to applying sequentially the best merges in $S(f_s)$. At each merge step $k_s$, $S(f_s)$ can be analyzed to provide $Q_{k_s}^b$, the set of components indices from $f_s$ whose sequential merges generated component $f_s^c(b)$ of $f_s^c$. With $Q_{k_s}^b$ known, each $f_s^c(b)$ can be computed in one step using equations (16)-(18). Since $Q_{k_s}^b$ refers to indices of the original components of $f_s$, it means that $Q_{k_s}^b$ contains the ancestry of $f_s(b)$ at each step $k_s$.

A useful property of the GC technique is that if a weight is applied to $f_s$, the sequence of merges in SD will remain unchanged, only their corresponding costs will be modified. Indeed, if $\lambda_s$ is applied to $f_s$ so that $\bar{f}_s \approx \lambda_s f_s$, each component of $f_s$ is weighted by $\lambda_s$ too. In this special case, computing wLML from equation (21), obtain:

$$\bar{\mathcal{D}}_{KL}(\lambda_s \bar{p} \| \lambda_s \bar{q}) = \lambda_s (\pi_i + \pi_j) \mathcal{D}_{KL}(p \| q). \tag{26}$$

Therefore, applying a weight $\lambda_s$ to each state s just impacts the wLML costs in $S(f_s)$.

If A is composed of L contextual states and N Gaussians, once $S(f_s)$ are built, models $\mathcal{A}^c$ of any size $N^c$ can be created, such that $L \leq N^c \leq N$. The minimum size for $\mathcal{A}^c$ is L because one Gaussian is the smallest any $f_s^c$ can be. Since $S(f_s)$ are independently computed across all states s, the only difference between two AMs with identical size $N^c$ is their respective number of components $N_s^c$. Finding good Gaussian assignments $N_s^c$ is significant for clustering models.

Gaussian Assignment

For any given target size $N^c$, many $\mathcal{A}^c$ can be produced, each of them with different $N_s^c$ for state s. $N_s^c$ are chosen so that $N^c = \Sigma_s N_s^c$. However, choosing $N_s^c$ means putting all states into competition to find an optimal sharing of $N^c$ components. This raises several issues. First, the selection of $N_s^c$ should take into account the distortion brought into the model A when creating $\mathcal{A}^c$. Second, it may be desirable to use some prior information about each state s when determining $N_s^c$. The first issue can be addressed by using the cost information recorded in $S(f_s)$ when selecting $N_s^c$. These costs are directly related to the distortion brought into the model by each merge. The second issue can be addressed by applying a weight $\lambda_s$ to all the costs recorded in $S(f_x)$ so as to amplify or decrease them compared to cost for other states. If choosing $N_s^c$ is based on wLML costs across states, this will result in assigning more (or less) Gaussians to this state. $\lambda_s$ can be chosen in many ways. For instance, during training time, each state is associated with some frames from the training data. The number of frames associated to state s divided by the total number of frames in the training data is the prior for state s and this prior can be used as $\lambda_s$. In practice, it is common that states modeling silence observe a large amount of the training data and therefore should be assigned greater $N_s^c$ than for other states. $\lambda_s$ can also be based on the language models or grammars used for decoding since they also reveal how often a state s is expected to be observed. Three assignment strategies are presented that address either one or both of the two issues raised in this section.

α-Assignment: Appropriately assigning a number of components to each $f_s$ is a problem first encountered during AM training. A common approach is to link $N_s$ to the number of frames in the training data modeled by state s. Define $c_s$ as the count of frames in the training data that align to a particular state s. $N_s$ is commonly (see Steve Young et al., The HTK Book (for HTK Version 3.3), Cambridge University Engineering Department, 2005) defined by using:

$$N_s(\alpha, \beta) = \lfloor \alpha c_s^\beta \rfloor \tag{27}$$

$$N(\alpha, \beta) = \sum_s \lfloor \alpha c_s^\beta \rfloor = N, \tag{28}$$

where $\beta=0:2$. Since training data can be largely composed of silence, $\beta$ is empirically chosen to ensure that states modeling silence do not grab most of the N Gaussians, at the expense of states modeling actual speech. With $\beta$ fixed, finding $\alpha$ is done with an iterative process. For clustering, $c_s$ can be obtained for A and this method provides $N_s^c$ given $N^c$. It is referred to as α-assignment, which is intrinsically sensitive to the state priors through $c_s$. However, it does not account for distortion when producing $\mathcal{A}$. Combining the greedy clustering with α-assignment is referred to as GC-α in the rest of this document.

Global Greedy Assignment: The global greedy assignment (GGA) extends the greedy approach used in building $S(f_s)$ to find the best sequence of merges across all states. $S(f_s)$ records the sequence of merges within $f_s$, using wLML cost function. GGA begins by setting merge sequence index $k_s=1$ for all states s. Then, GGA finds the best merge across all states by comparing costs recorded in each $S(f_s)[k_s]$. For s', state of the next best merge, the merge sequence index $k_s$ is increased, $k_{s'}=k_{s'}+1$, to point to the next best merge within $f_{s'}$. For each state s, GGA keeps track of which merge sequence index $k_s$ it must use to access the next best merge recorded in $S(f_s)[k_s]$. This simple technique iterates until the target $N^c$ is reached, ultimately providing $N_s^c$ as the number of Gaussians left in each $f_s^c$. If a state s has only one component left before $N^c$ is reached, it will be assigned only one Gaussian.

GGA is fast and requires very simple book-keeping. Indeed, no real merge occurs. At each iteration. GGA only needs to follow the sequence within each $S(f_s)$. GGA follows a merge sequence that tries, to some extent, to minimize merging distortion to the original model A. For GGA, each state s is equally likely to host the next best merge. However, it is straightforward to allow for different state prior $\lambda_s$ by modifying the costs in $S(f_s)[k_s]$ accordingly, as discussed earlier. Changing the state priors will change the sequence of best merges across states (but not within states). Combining GC with GGA is referred to as GC-GGA in this document.

Viterbi Selection: Finding an optimal set of $N_s^c$ can be done by using a Viterbi procedure inspired from a different optimal allocation problem in Etienne Marcheret et al., "Optimal quantization and bit allocation for compressing large feature space transforms," IEEE Workshop on Automatic Speech Recognition & Understanding 2009, pp. 64-69. Within each state s in A, $f_s$ is of size $N_s$. The size of $f_s^c$ at each merge step $k_s$ in $S(f_s)[k_s]$ os $\mathcal{N} - k_s$ for $1 \le k_s \le N_s - 1$. The following Viterbi procedure finds the optimal merge step $k^*_s$ so that $N^c = \Sigma_s N_s - k^*_s$. For each state s, the cumulative wLML cost is required at each step $k_s$ such that $$E(s, k_s) = \sum_{i=1}^{k_s} S(f_s)[i] \cdot \text{cost}.$$

Each cost can be adjusted for weight $\lambda_s$ if required. The procedure is:
1. Initialize $V(1,r) = E(1,r)$
2. For s=2, ... L apply the recursive relation $$V(s, r) = \min_{r_1 + r_2 = r} (E(s, r_1) + V(s-1, r_2))$$

3. Once s L is reached, backtrack to find the best k which gives the best assignment $N_s - k^*_s$.

This procedure gives the Gaussian assignments that minimize overall cost. It therefore optimizes both Gaussian assignment and attempts to minimize model distortion simultaneously. Again, $\lambda_s$ can be taken into account simply by modifying the cumulative costs before running the Viterbi procedure. Combining the greedy clustering and Viterbi selection is referred to as GC-viterbi in this document.

Model Refinement

Once A is clustered down into $\mathcal{A}^c$, it is possible to refine the parameters of $\mathcal{A}^c$ with varEM by using A as the model to match. Parameters of each $f_s^c$ will be updated to minimize $\mathcal{D}_{KL}(f_s \| f_s^c)$. For each state s, $f_s$ is used as the reference model and $f_s^c$ is used as the initial model for varEM. At the end of convergence, obtain a new model $\mathcal{A}^r$ composed by the set of $f_s^r$ that minimizes $\Sigma_s \mathcal{D}_{KL}(f_s \| f_s^c)$. The motivation for refining $\mathcal{A}^c$ into $\mathcal{A}^r$ is that the greedy clustering changes the structure of A by decreasing $N_s$ to $N_s^c$ following a sequence of merges with minimum local costs. However, it may be beneficial to use a global criterion to update parameters in $\mathcal{A}^c$ by allowing the parameters of $f_s^c$ to better match $f_s$, potentially recovering some distortion created within each $f_s^c$ when merging components.

EXPERIMENTS

It is to be emphasized that the experimental results are intended to illustrate what can be expected in some embodiments of the invention, but are not intended to be limiting; other embodiments may yield different results. In one or more embodiments, one goal is to provide clustered model $A^c$, refined or not, that can closely match the decoding performance of models trained from data, measured using WERs. The training set for the reference model includes 800 hours of US English data, with 10K speakers for a total of 800K utterances (4.3M words). It includes in-car speech in various noise conditions, recorded at 0, 30 and 60 mph with 16 KHz sampling frequency. The test set is 39K utterances and contains 206K words. It is a set of 47 different tasks of in-car speech with various US regional accents.

The reference model $A_{100K}$ is a 100K Gaussians model built on the training data. A set of 91 phonemes is used, each phoneme modeled with a three-state left to right hidden Markov model. These states are modeled using two-phoneme left context dependencies, yielding a total of 1519 CD states. The acoustic models for these CD states are built on 40-dimensional features obtained using Linear Discriminant Analysis (LDA) combined with Semi Tied Covariance (STC) transformation. CD states are modeled using GMMs with 66 Gaussians on average. Training includes a sequence of 30 iterations of the EM technique where CD state alignments are re-estimated every few steps of EM. Twenty baseline models were built from training data using 5K, 10K, ... , 100K Gaussians. All these models have different STCs and lie in different feature spaces. Since all clustered models are in the reference model feature space, for consistency, nineteen models were built using the 100K model's STC (100K-STC) from $A_{5K}$ to $A_{95K}$. Differences in WERs for these models and the baseline are small, as shown in the table of FIG. 3.

Baseline results show that the reference WER for $A_{100K}$ is 1.18%. WERs remain within 15% relative from 95K down to 40K, and then start increasing significantly below 25K. At 5K, WER has increased 110% relative to WER at 100K. For each Gaussian assignment strategy, GC was used with wLML to cluster $A_{100K}$ down to 5K, saving intermediate models every 5K Gaussians ($\mathcal{A}_{95K}^c, \ldots, \mathcal{A}_{5K}^c$), for a total of 19 clustered models for each GC-GGA, GC-α and GC-viterbi technique, GC-GGA was the first technique implemented and showed promising results. WERs stay close to the 100K-STC results from 95K-65K (sometimes even slightly improving on them), but then diverge slowly afterward and more sharply below 45K. At 5K, GC-GGA gives 3.30% WER, within 30% relative to 2.53% given by $A_{5K}$. FIG. 2 shows WERs for models trained from data (baseline), clustered using GC-GGA, GC-viterbi, GC-α refined with dvarEM. In FIG. 2, results for only a few techniques from the table of FIG. 3 are plotted. In one or more embodiments, a significant goal is to follow the curve for results from baseline models for as long as possible while decreasing model size, which GC-GGA fails to do below 45K.

Results for a technique called GC-models are also reported. GC-models refers to taking the Gaussian assignments directly from the 100K-STC models trained from data. This gives the best assignment $N^*_s$ chosen by the training procedure. GC-models results are consistently better than that of GC-GGA over the entire 5K-95K range. GC-models is an unrealistic technique as it is typically necessary to train models first to find Gaussian assignments to create clustered models of the same size. However, its results give a clear indication that Gaussian assignment is significant in order to cluster the reference model optimally, especially when creating small models. For 5K models, each f, has an average of only 3.3 Gaussians. A good assignment is important. One difference is that the training procedure, in one or more embodiments, allows for splitting and merging of Gaussians within CD state during EM. Interestingly, GC-α gives similar WERs to GC-models for the entire 5K-95K range. This is not entirely surprising since it uses a similar criterion to assign Gaussians as in the training. However, only merging is allowed when clustering down $A_{100K}$. From 45K-95K, GC-α matches or improves on 100K-STC results. Below 45K, a small divergence begins and, at 5K, GC-α gives 2.87%, only within 13% of $A_{5K}$, a clear improvement over GC-GGA at 30% of $A_{5K}$.

GC-viterbi gives results equivalent to GC-α from 95K to 10K. For 10K, it is slightly better than GC-GGA, but it is almost the same as GC-GGA for 5K. This is counter intuitive as GC-viterbi may be expected to give an "optimal" assignment and therefore better WERs. However, after analysis of $N_s$ given by GC-viterbi, it is clear that the states modeling silence have much smaller $N_s^c$ than for GC-α. In $A_{100K}$, silence states have more Gaussians than any other states, and are likely to overlap more. Therefore, $S(f_s)$ for those states have merge steps with smaller costs than all other states. In at least some embodiments, adjusting for state priors is necessary when using GC-viterbi. Without it, the silence models are basically decimated to the benefit of the other states. By using state prior $\lambda^*_s = \lambda_s^\beta / \Sigma_s \lambda_s^\beta$ with $\beta = 0.2$ reminiscent of α-assignment, obtain the best results for GC-viterbi reported in the table of FIG. 3. However, WERs are really sensitive to the choice of β. If β=0<0.2 is chosen, silence states are decimated early on in the merging steps (model $\mathcal{A}_{95K}$ already shows signs of decimated silence states). For small models $\mathcal{A}_{5K}$, they are assigned only one Gaussian each, increasing WER significantly. For β=2>0.2, silence states are grabbing a large number of Gaussians which starve states modeling speech, especially in small models. Here also WERs increase rapidly.

When clustering $A_{100K}$ into very small models like $\mathcal{A}_{5K}^c$ (20 times smaller), achieving WERs close to 100K-STC models WERs becomes a delicate equilibrium of allocating Gaussians between speech states and silence states. This is implicitly done with β=0.2 in equation (28). Since β was historically tuned for large models, it could be tuned for smaller models. However, it is believed that a step further should be taken to treat silence and speech states as two different categories. Given the teachings herein, the skilled artisan will be able to implement such an approach. For example, in a non-limiting example above, equation (28) was used for Gaussian assignment for both speech and silence states in an α-assignment scheme. However, instead of using the single equation (28) with the single value of β for both speech states and silence states, different assignment criteria (e.g., different equations or the same equation with different parameters) could be used for assignment of speech states and assignment of silence states. In a non-limiting example, equation (28) could be used for both speech and silence states but with different values of 0 and/or different values of N. For example, 1000 Gaussians could be assigned to silence and 9000 Gaussians could be assigned to speech. Approaches using other probability density functions (e.g., other than those using Gaussian mixture models) are also possible as discussed elsewhere herein (e.g., exponential family mixture models).

Note that, in some instances, approximately 30% of training data may be associated with silence and about 70% with speech; speech may be associated with thousands of states and silence with only a handful of states. Note also that in at least some instances, "silence" includes conditions of non-speech noise such as background noise, auto noise, sighs, coughs, and the like.

To improve upon GC-α, model refinement was used using discrete varEM (dvarEM). WERs are better overall and, at 5K, GC-α with dvarEM reaches 2.76%, within 9% of $A_{5K}$. Over the 5K-95K range, models built from GC-α with dvarEM are on average within 2.7% of the WERs for 100K-STC models built from data. In fact, for 9 out of 19 clustered models, GC-α with dvarEM is better than the baseline models. This makes clustering a reference model a viable option to training models from data.

Speech Recognition Block Diagram

Figure 6:
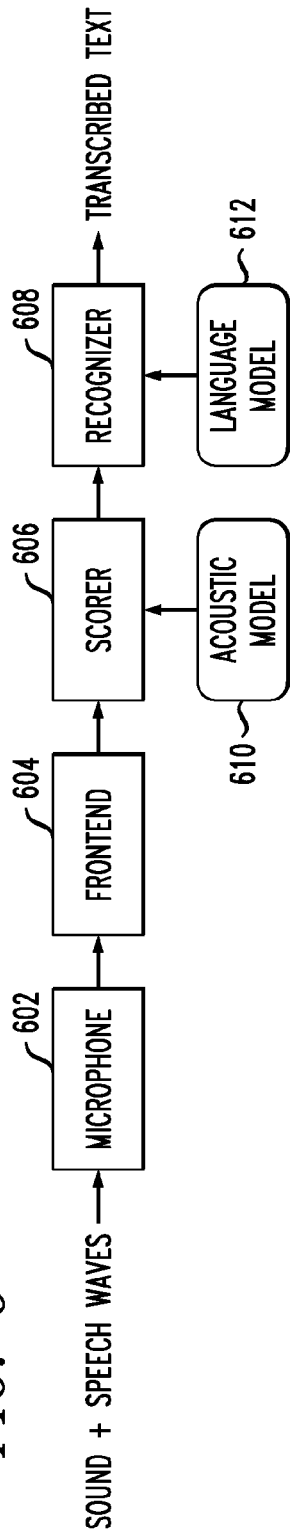
FIG. 6 is a block diagram of an automatic speech recognition system.

FIG. 6 presents an exemplary block diagram for an automatic speech recognition system. A microphone 602 picks up speech and other sounds and generates an electrical signal input to an acoustic front end 604, with the output of 604 routed to scorer 606 which uses acoustic model 610. Recognizer 608 then takes as input the output of the scorer and employs language model 612 to produce transcribed text corresponding to the input speech. Model 610 can include a reference acoustic model or a restructured acoustic model generated as described herein.

References

The skilled artisan will already be familiar with the following references, which have been cited above, and, given the teachings herein, will be able to make and use embodiments of the invention and perceive the best mode. Nevertheless, out of an abundance of caution, all of the following nine (9) references are fully incorporated herein by reference in their entireties for all purposes.

1. S. Kullback, Information Theory and Statistics, Dover Publications, Mineola, N.Y., 1997.
2. Pierre L. Dognin et al., "Refactoring acoustic models using variational density approximation," in *ICASSP*, April 2009, pp. 4473-4476.
3. Pierre L. Dognin et al., "Refactoring acoustic models using variational expectation maximization," in *Interspeech*, September 2009, pp. 212-215.
4. Kai Zhang and James T. Kwok, "Simplifying mixture models through function approximation," in *NIPS* 19, pp. 1577-1584. MIT Press, 2007.
5. Xiao-Bing Li et al., "Optimal clustering and non-uniform allocation of Gaussian kernels in scalar dimension for HMM compression," in *ICASSP*, March 2005, pp. 669-672.
6. Imre Csiszár, "Why least squares and maximum entropy? An axiomatic approach to inference for linear inverse problems," *Annals of Statistics*, vol. 19, no, 4, pp. 2032-2066, 1991.
7. Steve Young et al., *The HTK Book* (for HTK Version 3.3), Cambridge University Engineering Department, 2005.
8. Etienne Marcheret et al., "optimal quantization and bit allocation for compressing large feature space transforms," IEEE Workshop on Automatic Speech Recognition & Understanding 2009, pp. 64-69.
9. Pierre L. Dognin et al., "Restructuring Exponential Family Mixture Models", Interspeech 2010, September 2010, pp. 62-65.

Recapitulation

One or more embodiments provide a set of tools for restructuring acoustic models in an ASR task, while preserving recognition performance compared to equivalent models built from data. These tools were applied to define a greedy clustering technique that can efficiently generate, from a reference model, smaller clustered models of any size. The clustered models have ASR performance comparable to models of the same size built from training data. Advances in Gaussian assignment techniques lead to significant improvement in WER, especially for clustered models with large size reduction. For 5K, WER went from being within 30% of the model built from data to 9% with GC-α with discrete varEM. One or more embodiments provide a greedy clustering process including two independent steps. The first step generates the sequence of best merges for each CD state, while the second step provides a Gaussian assignment for every state. This two step approach is particularly suited for parallelization and is significant in the handling of large models. Furthermore, this greedy clustering technique can generate clustered models on demand as most of the computation is done up front or 'offline.' This renders possible applications where smaller models can be built on demand from a reference model to accommodate new and changing constraints over time.

Figure 5:
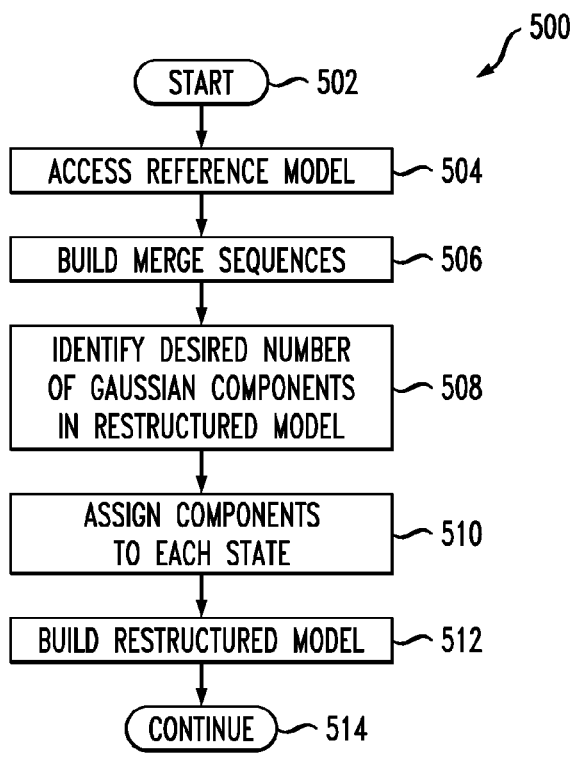
FIG. 5 is a flow chart showing an exemplary method, according to an aspect of the invention.

Reference should now be had to flow chart 500 of FIG. 5, which begins in step 502. Given the discussion thus far, it will be appreciated that, in general terms, an exemplary method, according to an aspect of the invention, includes the step 504 of obtaining access to a large reference acoustic model for automatic speech recognition, the large reference acoustic model having L states modeled by L mixture models, the large reference acoustic model having N components (in some instances, the large reference acoustic model is built from actual data; however, techniques herein work on models built from data or models derived from models built from data, as long as the reference model is structured with states modeled with mixture models). It will be appreciated that "large" is a relative teini, meaning that the reference model is larger than appropriate for one or more computing environments and is therefore to be the basis for a smaller, restructured acoustic model.

An additional step 508 includes identifying a desired number of components $N^c$, less than N, to be used in the restructured acoustic model. The restructured acoustic model is derived from the reference acoustic model, and the desired number of components $N^c$ is selected based on the computing environment in which the restructured acoustic model is to be deployed. The restructured acoustic model also has L states.

A number of techniques can be used to identify the desired number of components in the restructured model. In some instances, rules of thumb familiar to the skilled artisan can be employed. In other instances, the decision can be based on the hardware limitations of the system that will use the restructured acoustic model; for example, there may only be 400 MB of space available for the restructured acoustic model in a given instance; this leads to the allowable number of components. In some cases, equation (28) (in essence, an empirical formula) can be employed (there generally being a linear relationship between the log of the counts and the log of the number of Gaussians).

A further step 506 includes, for each given one of the L mixture models in the reference acoustic model, building a merge sequence which records, for a given cost function, sequential mergers of pairs of the components associated with the given one of the mixture models. This can be carried out, for example, as described above in the portion entitled "Greedy Clustering and Merge-Sequence Building" and as depicted in Technique 1 of FIG. 1. A still further step 510 includes assigning a portion of the $N^c$ components to each of the L states in the restructured acoustic model. This can be carried out, for example, as described above in the portion entitled "Gaussian Assignment." A further step 512 includes building the restructured acoustic model by, for each given one of the L states in the restructured acoustic model, applying the merge sequence to a corresponding one of the L mixture models in the reference acoustic model until the portion of the $N^c$ components assigned to the given one of the L states is achieved.

Note that the sequence of merge can be done all at once if speed-up is needed. For instance, if it is known that one final weighted component:

f_merged=merge(merge erge(1,2),merge(3,4)),merge(5,6)), is desired, where 1,2,3,4,5,6 are indices of components to be merged in the mixture model, this can be carried out all at once as:

f_merged=merge(1,2,3,4,5,6).

This is because the merge() operation employed in one or more embodiments gives the Maximum Likelihood merge of two components, and has the following properties:

merge(a,b)=merge(b,a)

merge(merge(a,b),c)=merge(a,merge(b,c))=merge(b, merge(a,c))=erge(a,b,c)

Basically, the order of merges does not matter, the final merged component will always be the same. Therefore, if one has the relevant equations to do merge(a,b,c), it can be faster to do merge(a,b,c) than merge((merge(a,b),c). For the avoidance of doubt, as used herein, including the claims, "applying the merge sequence to a corresponding one of the L mixture models in the reference acoustic model until the portion of the $N^c$ components assigned to the given one of the L states is achieved" is intended to cover sequential or "all at once" approaches or combinations thereof.

Processing continues at 514.

As used herein, a mixture model is a probability density function (pdf) that is represented as a sum of weighted components (each of them can be of different form (Gaussians, Exponential densities, and the like) where the weights sum to one, and the total integral of the pdf is one. Further, as used herein, the term "component" is understood, in the context of statistical modeling, as being one individual element of the mixture.

It will be appreciated that the restructured model can be stored in a computer-readable storage medium and used in an ASR system.

In some instances, step 510 includes applying an α-assignment scheme, such as described above in the portion entitled "α-Assignment." Such a scheme can involve, for example, assigning the portion of the $N^c$ components to each of the L states in the restructured acoustic model by taking into account the number of frames in the actual data modeled by a given one of the L states, and correcting for those of the L states modeling silence.

In some cases, step 510 includes applying a global greedy assignment scheme across all the L states, to reduce merge distortion, such as described above in the portion entitled "*Global Greedy Assignment*." Such a scheme can involve, for example, iterating to find a best merge across all the L states until only the portion of the $N^c$ components is left for each of the L states in the restructured acoustic model.

In some embodiments, step 510 includes applying a Viterbi selection scheme, such as described above in the portion entitled "Viterbi Selection." Such a scheme can involve, for example, recursively optimizing the assignment of the portion of the $N^c$ components to each of the L states in the restructured acoustic model while simultaneously minimizing model distortion.

In at least some cases, the cost function is weighted local maximum likelihood as described above.

Note that FIG. 5 shows step 506 prior to step 508. While the steps in FIG. 5 can be carried out in any desired logical sequence, in one or more embodiments, step 506 is performed "up front," so that the restructured acoustic model can be built on demand. That is to say, computationally intensive step 506 can be carried out off line, as soon as access is obtained to the reference model, and the merge sequences can be stored for later use such that the restructured model can be rapidly built by carrying out steps 510 and 512 as soon as the desired number of components in the restructured model is known.

It will be appreciated that in some cases, the method can include actually building the reference model, while in other cases, a model prepared outside the scope of the method can be accessed. Step 504 is intended to cover either case.

In some cases, the states are context-dependent states.

In some cases, the mixture models are Gaussian mixture models.

Figure 7:
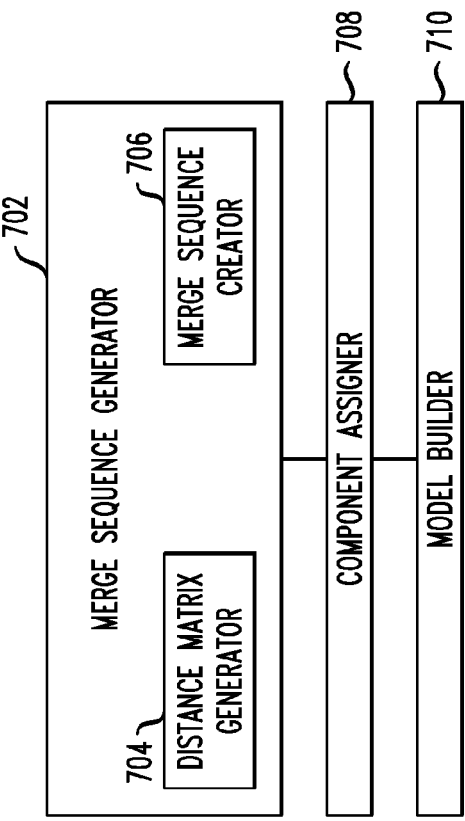
FIG. 7 is a software architecture diagram.

With reference now to the block diagram of FIG. 7, by way of re-statement and provision of additional helpful material, in at least some cases, generate merge sequences; for example, with merge sequence generator 702. This can be done, for example, by:

using distance matrix generator 704 to determine and store a distance matrix for each state (in parallel) (i.e., how far (distance, divergence) every component in the mixture for a given state is from every other component in the mixture for that state), and using merge sequence creator 706 to create a merge sequence for each state (in parallel), looking at each stage into the matrix for the two components with the smallest distance between them.

Then, using component assignor 708, find the number of components for each state, and using model builder 710, generate a new (restructured) model, given the merge sequences and number of components for each state.

Exemplary System and Article of Manufacture Details

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

One or more embodiments of the invention, or elements thereof, can be implemented in the form of an apparatus including a memory and at least one processor that is coupled to the memory and operative to perform exemplary method steps.

Figure 4:
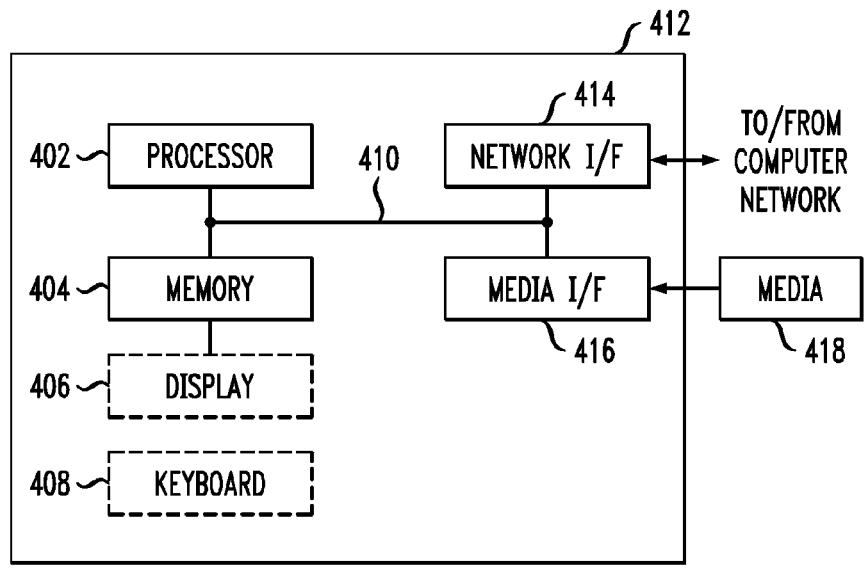
FIG. 4 depicts a computer system that may be useful in implementing one or more aspects and/or elements of the invention.

One or more embodiments can make use of software running on a general purpose computer or workstation. With reference to FIG. 4, such an implementation might employ, for example, a processor 402, a memory 404, and an input/output interface formed, for example, by a display 406 and a keyboard 408. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 402, memory 404, and input/output interface such as display 406 and keyboard 408 can be interconnected, for example, via bus 410 as part of a data processing unit 412. Suitable interconnections, for example via bus 410, can also be provided to a network interface 414, such as a network card, which can be provided to interface with a computer network, and to a media interface 416, such as a diskette or CD-ROM drive, which can be provided to interface with media 418.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 402 coupled directly or indirectly to memory elements 404 through a system bus 410. The memory elements can include local memory employed during actual implementation of the program code, bulk storage, and cache memories which provide temporary storage of at least some program code in order to reduce the number of times code must be retrieved from bulk storage during implementation.

input/output or I/O devices (including but not limited to keyboards 408, displays 406, pointing devices, and the like) can be coupled to the system either directly (such as via bus 410) or through intervening I/O controllers (omitted for clarity).

Network adapters such as network interface 414 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 412 as shown in FIG. 4) running a server program. It will be understood that such a physical server may or may not include a display and keyboard.

As noted, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Media block 418 is a non-limiting example. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). Other non-limiting examples of suitable languages include:
1) Python
2) Perl
3) Ruby
4) MATLAB language (registered trademark of The MathWorks, Inc., Natick, Mass., U.S.A.)
5) Octave (high-level language, primarily intended for numerical computations, mostly compatible with MATLAB language)
6) other scientific computing languages Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and/or block diagrams in the FIGS. illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the elements depicted in the block diagrams and/or described herein; by way of example and not limitation, a merge sequence generator module, a component assigner module, and a model builder module. Optionally, the merge sequence generator module can include a distance matrix generator module and a merge sequence creator module. The method steps can then be carried out using the distinct software modules and/or sub-modules of the system, as described above, executing on one or more hardware processors 402. Each of the distinct modules or sub-modules includes code to implement the corresponding equations. Further, a computer program product can include a computer-readable storage medium with code adapted to be implemented to carry out one or more method steps described herein, including the provision of the system with the distinct software modules. In addition, the resulting restructured acoustic model or models can be stored in a computer-readable storage medium and can be used in a system such as that in FIG. 6 wherein distinct software modules can be provided to implement appropriate ones of the blocks.

In any case, it should be understood that the components illustrated herein may be implemented in various foul's of hardware, software, or combinations thereof; for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:

obtaining access to a large reference acoustic model for automatic speech recognition, said large reference acoustic model having L states modeled by L mixture models, said large reference acoustic model having N components;

identifying a desired number of components $N^c$, less than N, to be used in a restructured acoustic model derived from said reference acoustic model, said desired number of components $N^c$ being selected based on a computing environment in which said restructured acoustic model is to be deployed, said restructured acoustic model also having L states;

for each given one of said L mixture models in said reference acoustic model, building a merge sequence which records, for a given cost function, sequential mergers of pairs of said components associated with said given one of said mixture models;

assigning a portion of said $N^c$ components to each of said L states in said restructured acoustic model;

building said restructured acoustic model by, for each given one of said L states in said restructured acoustic model, applying said merge sequence to a corresponding one of said L mixture models in said reference acoustic model until said portion of said $N^c$ components assigned to said given one of said L states is achieved; and providing a system, wherein the system comprises distinct software modules, each of the distinct software modules being embodied on a computer-readable storage medium, and wherein the distinct software modules comprise a merge sequence generator module, a component assigner module, and a model builder module; wherein:

said building of said merge sequence is carried out by said merge sequence generator module executing on at least one hardware processor;

said assigning of said portion of said $N^c$ components is carried out by said component assigner module executing on said at least one hardware processor; and said building of said restructured acoustic model is carried out by said model builder module executing on said at least one hardware processor.

2. The method of claim 1, wherein said assigning comprises applying an alpha-assignment scheme.

3. The method of claim 2, wherein said alpha-assignment scheme comprises assigning said portion of said $N^c$ components to each of said L states in said restructured acoustic model by taking into account a number of frames in said actual data modeled by a given one of said L states, and correcting for those of said L states modeling silence.

4. The method of claim 1, wherein said assigning comprises applying a global greedy assignment scheme across all said L states, to reduce merge distortion.

5. The method of claim 4, wherein said global greedy assignment scheme comprises iterating to find a best merge across all said L states until only said portion of said $N^c$ components is left for each of said L states in said restructured acoustic model.

6. The method of claim 1, wherein said assigning comprises applying a Viterbi selection scheme.

7. The method of claim 6, said Viterbi selection scheme comprises recursively optimizing said assignment of said portion of said $N^c$ components to each of said L states in said restructured acoustic model while simultaneously minimizing model distortion.

8. The method of claim 1, wherein said cost function comprises weighted local maximum likelihood.

9. The method of claim 1, wherein said building of said merge sequence for each given one of said L mixture models in said reference acoustic model is performed up front, so that said restructured acoustic model can be built on demand.

10. The method of claim 1, wherein said states comprise context-dependent states.

11. The method of claim 1, wherein said mixture models comprise Gaussian mixture models.

12. A computer program product comprising a computer non-transitory readable storage medium having computer readable program code embodied therewith, said computer readable program code comprising:

computer readable program code configured to, for each given one of L mixture models in a large reference acoustic model for automatic speech recognition, build a merge sequence, said large reference acoustic model having L states modeled by said L mixture models, said large reference acoustic model having N components, said merge sequence recording, for a given cost function, sequential mergers of pairs of said components associated with said given one of said mixture models;

computer readable program code configured to assign a portion of a desired number of components $N^c$ to each of said L states in a restructured acoustic model, said desired number of components being less than N, said desired number of components to be used in said restructured acoustic model, said restructured acoustic model being derived from said reference acoustic model, said desired number of components $N^c$ being selected based on a computing environment in which said restructured acoustic model is to be deployed, said restructured acoustic model also having L states; and computer readable program code configured to build said restructured acoustic model by, for each given one of said L states in said restructured acoustic model, applying said merge sequence to a corresponding one of said L mixture models in said reference acoustic model until said portion of said $N^c$ components assigned to said given one of said L states is achieved.

13. The computer program product of claim 12, wherein said computer readable program code configured to assign comprises computer readable program code configured to apply an alpha-assignment scheme.

14. The computer program product of claim 13, wherein said alpha-assignment scheme comprises assigning said portion of said $N^c$ components to each of said L states in said restructured acoustic model by taking into account a number of frames in said actual data modeled by a given one of said L states, and correcting for those of said L states modeling silence.

15. The computer program product of claim 12, wherein said computer readable program code configured to assign comprises computer readable program code configured to apply a global greedy assignment scheme across all said L states, to reduce merge distortion.

16. The computer program product of claim 15, wherein said global greedy assignment scheme comprises iterating to find a best merge across all said L states until only said portion of said $N^c$ components is left for each of said L states in said restructured acoustic model.

17. The computer program product of claim 12, wherein said computer readable program code configured to assign comprises computer readable program code configured to apply a Viterbi selection scheme.

18. The computer program product of claim 17, wherein said Viterbi selection scheme comprises recursively optimizing said assignment of said portion of said $N^c$ components to each of said L states in said restructured acoustic model while simultaneously minimizing model distortion.

19. An apparatus comprising:
a memory; and
at least one processor, coupled to said memory, and operative to:
obtain access to a large reference acoustic model for automatic speech recognition, said large reference acoustic model having L states modeled by L mixture models, said large reference acoustic model having N components;
obtain as input a desired number of components $N^c$, less than N, to be used in a restructured acoustic model derived from said reference acoustic model, said desired number of components $N^c$ being selected based on a computing environment in which said restructured acoustic model is to be deployed, said restructured acoustic model also having L states;
for each given one of said L mixture models in said reference acoustic model, build a merge sequence which records, for a given cost function, sequential mergers of pairs of said components associated with said given one of said mixture models;
assign a portion of said $N^c$ components to each of said L states in said restructured acoustic model; and
build said restructured acoustic model by, for each given one of said L states in said restructured acoustic model, applying said merge sequence to a corresponding one of said L mixture models in said reference acoustic model until said portion of said $N^c$ components assigned to said given one of said L states is achieved.

20. The apparatus of claim 19, wherein said at least one processor is operative to assign by applying an alpha-assignment scheme.

21. The apparatus of claim 19, wherein said at least one processor is operative to assign by applying a global greedy assignment scheme across all said L states, to reduce merge distortion.

22. The apparatus of claim 19, wherein said at least one processor is operative to assign by applying a Viterbi selection scheme.

23. The apparatus of claim 19, further comprising a plurality of distinct software modules, each of the distinct software modules being embodied on a computer-readable storage medium, and wherein the distinct software modules comprise a merge sequence generator module, a component assigner module, and a model builder module;
wherein:
said at least one processor is operative to build said merge sequence by executing said merge sequence generator module;
said at least one processor is operative to assign said portion of said $N^c$ components by executing said component assigner module; and
said at least one processor is operative to build said restructured acoustic model by executing said model builder module.

24. An apparatus comprising:
means for obtaining access to a large reference acoustic model for automatic speech recognition, said large reference acoustic model having L states modeled by L mixture models, said large reference acoustic model having N components;
means for obtaining as input a desired number of components $N^c$, less than N, to be used in a restructured acoustic model derived from said reference acoustic model, said desired number of components $N^c$ being selected based on a computing environment in which said restructured acoustic model is to be deployed, said restructured acoustic model also having L states;
means for, for each given one of said L mixture models in said reference acoustic model, building a merge sequence which records, for a given cost function, sequential mergers of pairs of said components associated with said given one of said mixture models;
means for assigning a portion of said $N^c$ components to each of said L states in said restructured acoustic model; and
means for building said restructured acoustic model by, for each given one of said L states in said restructured acoustic model, applying said merge sequence to a corresponding one of said L mixture models in said reference acoustic model until said portion of said $N^c$ components assigned to said given one of said L states is achieved.

* * * * *